US009188493B2

(12) United States Patent
Honda et al.

(10) Patent No.: US 9,188,493 B2
(45) Date of Patent: Nov. 17, 2015

(54) METHOD AND APPARATUS FOR MEASURING SURFACE TEMPERATURE OF CAST SLAB

(71) Applicant: NIPPON STEEL & SUMITOMO METAL CORPORATION, Tokyo (JP)

(72) Inventors: Tatsuro Honda, Tokyo (JP); Chihiro Uematsu, Tokyo (JP); Yoichi Inoue, Tokyo (JP); Naoki Tajima, Tokyo (JP); Yasuhiro Mizuno, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/351,691

(22) PCT Filed: Aug. 27, 2013

(86) PCT No.: PCT/JP2013/072860
§ 371 (c)(1),
(2) Date: Apr. 14, 2014

(87) PCT Pub. No.: WO2014/034657
PCT Pub. Date: Mar. 6, 2014

(65) Prior Publication Data
US 2015/0204732 A1    Jul. 23, 2015

(30) Foreign Application Priority Data

Aug. 28, 2012 (JP) .................................. 2012-187188

(51) Int. Cl.
*G01K 11/32* (2006.01)
*B22D 11/124* (2006.01)
(Continued)

(52) U.S. Cl.
CPC .............. *G01K 11/32* (2013.01); *B22D 11/124* (2013.01); *B22D 11/16* (2013.01); *B22D 11/202* (2013.01)

(58) Field of Classification Search
CPC .... B22D 2/006; B22D 11/182; B22D 11/124; B22D 11/16; B22D 11/202; G01K 11/32; G01K 11/3213
USPC ........................................................ 374/161
See application file for complete search history.

(56) References Cited

U.S. PATENT DOCUMENTS 4,024,764 A * 5/1977 Shipman et al. .............. 374/104
6,446,703 B1 * 9/2002 Roder et al. .................. 164/455
(Continued)

FOREIGN PATENT DOCUMENTS

JP        54-32130      3/1979
JP        06-12508      5/1983
(Continued)

*Primary Examiner* — Lisa Caputo
*Assistant Examiner* — Philip Cotey
(74) *Attorney, Agent, or Firm* — Clark & Brody

(57) ABSTRACT

A main object of the present invention is to provide a method capable of measuring surface temperatures of a plurality of points of cast slab at a secondary cooling zone of a continuous caster with a good accuracy and at low cost. The method comprises the steps of inserting one end of a plurality of optical fibers 3 respectively to nozzles 1 and tubes 2, and installing each nozzle between support rolls that support the cast slab, while spraying purge air from each nozzle toward a surface of the cast slab, receiving a thermal radiation light from the cast slab at the one end of each optical fiber, gathering other ends of the optical fibers 3, 81 in a bundle to take images including a core image of the other end of each optical fibers by an imaging means 5, and calculating the surface temperature of the cast slab.

15 Claims, 17 Drawing Sheets

(51) Int. Cl.
*B22D 11/20* (2006.01)
*B22D 11/16* (2006.01)

(56) References Cited

U.S. PATENT DOCUMENTS

| | | |
|---|---|---|
| 6,923,573 B2 | 8/2005 | Yamashita et al. |
| 2007/0251663 A1 | 11/2007 | Sheldon et al. |
| 2008/0035298 A1* | 2/2008 | Yu et al. ............ 164/455 |
| 2008/0198900 A1* | 8/2008 | Myhre ............ 374/179 |
| 2008/0205480 A1* | 8/2008 | Barbosa et al. ............ 374/131 |
| 2011/0299065 A1* | 12/2011 | Loebig et al. ............ 356/51 |

FOREIGN PATENT DOCUMENTS

| | | |
|---|---|---|
| JP | 58-90362 | 5/1983 |
| JP | 2009-195959 | 9/2009 |
| JP | 2013-240824 | 12/2013 |

* cited by examiner

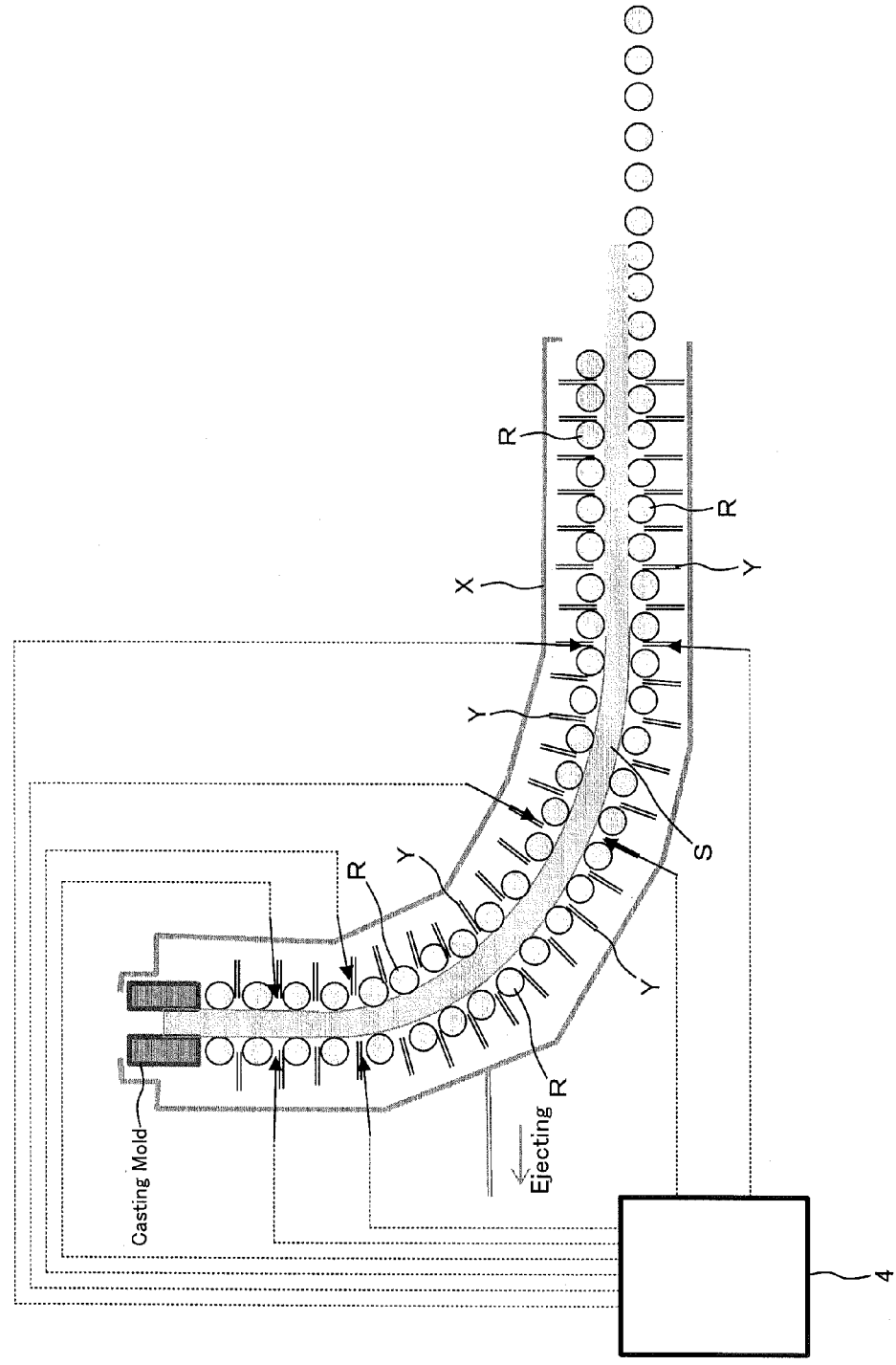

METHOD AND APPARATUS FOR MEASURING SURFACE TEMPERATURE OF CAST SLAB

TECHNICAL FIELD

The present invention relates to a method and apparatus for measuring a surface temperature of a cast slab at a secondary cooling zone of a continuous caster. Specifically, the present invention relates to a method and apparatus capable of measuring surface temperatures of a plurality of points of a cast slab, at a secondary cooling zone of a continuous caster including a vertical bending type, with a good accuracy and at low cost.

BACKGROUND ART

In a continuous casting process of steel, a cast slab is manufactured by: cooling a molten steel in a casting mold to produce a solidifying shell; then pulling out the produced solidifying shell to cool at a secondary cooling zone; and solidifying the shell until solidified in center. At this time, in order to control a surface temperature of the cast slab to have an appropriate value so as to inhibit generation of surface cracking and segregation of cast slab, heretofore, a measurement of the surface temperature of the cast slab at the secondary cooling zone of a continuous caster has been carried out.

As points at which the surface temperature of the cast slab is to be measured at the secondary cooling zone of the continuous caster, there are many points in a longitudinal direction (a casting direction) and a width direction of the cast slab having distances from each other. Also, in order to measure the surface temperature of the cast slab continuously, it is desirable to employ a contactless thermometer such as a radiation thermometer, however, cooling water sprayed at the secondary cooling zone becomes to be a disturbance factor. Therefore, problems as below exist.

<Error in temperature measurement due to absorption of light by water>

A thermal radiation light from a surface of the cast slab to be detected is absorbed by water existing in a light path in between the cast slab and the radiation thermometer. Because of this absorption, an error in temperature measurement can occur, and sometimes the temperature cannot be measured.

<Error in temperature measurement due to light scattering occurred by water drop>

The thermal radiation light from the surface of the cast slab to be detected is scattered and decayed by water drops existing in the light path of the radiation thermometer (dropped water from support rolls that support the cast slab and cooling water have contact with the cast slab to evaporate, after that the water vapor is condensed to be water drops in the form of a mist). Because of this scattering, an error in temperature measurement can occur, and sometimes the temperature cannot be measured. Also, in a continuous caster of a vertical bending type, a first half of the continuous casting process has a vertical pass line, that is, a measurement face of the cast slab is in a vertical position, and a last half of the continuous casting process has a horizontal pass line, that is, a measurement face of the cast slab is in a horizontal position. Therefore, influence from the cooling water to temperature measurement differs depending on places of the temperature measurement.

<Concern of ingress of large amount of water into nozzle when casting is started>

Conventionally, in order to inhibit influence from water and water drops existing in the light path of the radiation thermometer, a method of jetting purge air from nozzles toward a target of temperature measurement has been suggested. On the other hand, in a continuous caster, a large amount of water flows in a time period from before the casting is started till the very first stage after the casting is started and the like. Specifically, nowadays, in the vertical pass line in the first half of the continuous casting, a large amount of sprayed cooling water falls down. Because of this, there is a possibility of ingress of water into the nozzles that jet the purge air. A more specific description will be made as below. As a control of cooling water, in every section that is generally called a segment, spraying of cooling water is switched on and off and the amount of the cooling water is adjusted, based on a setting to each segment. Therefore, in a very first stage after the casting is started, when a part of a cast slab reaches to a segment, a certain amount of cooling water is sprayed in the segment overall. Then, in a downstream part of the segment, in which the cast slab has not entered, the cooling water does not hit the cast slab but run down. For example, when the cast slab has reached to an area that covers ⅓ from a most upstream side of cooling zone called as a top zone of directly below of a casting mold, a remained area of ⅔ on a downstream side from the top zone does not contribute to cooling of the cast slab. A large amount of water sprayed to the area that does not contribute to cooling of the cast slab possibly enters into the nozzles for purge air of the radiation thermometer installed lower than the area. Especially, nowadays, methods to strongly cool a cast slab at a most upper portion of a secondary cooling zone of a continuous caster and the like have been developed, thus an influence from a large amount of sprayed water falling down has becoming larger than ever before.

<Problem accompanied by temperature measurement at many points>In order to inhibit surface cracking of cast slab made of Ni steel and the like in a continuous caster of a vertical bending type, conditions of strain rate and surface temperature of a cast slab at a bending part and correcting part of the continuous caster need to be adequately controlled. The strain rate is decided by structure (curvature) of each part and casting speed. The structure of each part is fixed, and it is difficult to change the casting speed since the casting speed controls productivity. Therefore, surface temperature of the cast slab at each part needs to be adequately controlled. However, there are a lot of changing factors that cannot be detected, such as degradation of cooling sprays at the secondary cooling zone, variation of heat transmission parameters such as water temperature and amount of cooling water, component and temperature distribution in a width direction of the cast slab, temperature variation and flux in a casting mold of molten steel. Therefore, it is difficult to obtain an accurate surface temperature of the cast slab at required portion by a cooling model and the like. Because of this, surface temperature measurement of a cast slab at or near each portion with a high accuracy is a very effective means.

Also, by measuring the surface temperature at only one point of the cast slab to reflect the temperature measurement value to the cooling model, it is difficult to obtain the surface temperatures of other portions with a sufficient accuracy. The reason is that since the surface temperature of the one point is influenced by a lot of parameters as described, even when a same surface temperature is detected, the temperature distribution in a thickness direction of the cast slab and a thickness of a solidifying shell are sometimes different, and in such a case, surface temperature of the cast slab at a point located lower side than the point where the surface temperature is measured is to be different from each other. As described below, it is insufficient to measure temperature at only one convenient point of the cast slab, but it is needed to measure temperatures of a plurality of points in a casting direction. It is also considered that if steel grade of the cast slab or pulling out speed of steel is changed, the optimal position in the casting direction where the surface temperature is to be measured in order to inhibit surface cracking is changed. From this viewpoint as well, it is desirable to carry out temperature measurement at a plurality of points in the casting direction.

Further, since temperature distribution exists in the width direction of the cast slab, it is also needed to measure surface temperatures of a plurality of points in the width direction of each part. Regarding the width direction of the cast slab, temperature measurements of at least points located near both ends and central portion are needed. For example, when a shaft bearing of a support roll that supports the cast slab exists in an area corresponding to ⅓ of width of the cast slab from the edge of the cast slab in the width direction, sometimes only the 2 points in the width direction near the shaft bearing have different temperatures from other points. Further, an area corresponding to ⅓ to ¼ of the width from the edge of the cast slab in the width direction may have a higher temperature than a surrounding area. Considering this, the temperature measurement is needed at 5 to 7 points in the width direction. Therefore, it is desirable to carry out the temperature measurement at 2 points in the casting direction, and for example 6 points in the width direction, on both sides of the cast slab (temperature measurement at 24 points in total). As described above, it is needed to carry out the temperature measurement at many points having distances.

In order to measure the surface temperatures at many points having distances, many radiation thermometers are needed, thereby a large amount of initial cost is needed including installation work of the radiation thermometers. For instance, in order to install 12 of radiation thermometers, a large amount of initial cost of (cost of the radiation thermometers+cost of installation work+cost of additional devices)×12 is needed. Also, considering a possibility of breakdown of the radiation thermometers, there is a need to prepare extra radiation thermometers, thereby more radiation thermometers are needed than that to be actually installed to the continuous caster. Also, when many radiation thermometers are used, its maintenance becomes troublesome, and that results in increasing running cost. Confirmations of accuracy and normal operation (checking) are required to the radiation thermometers periodically such as from every half year to every several years. In order to check the radiation thermometer, some work such as removing the radiation thermometer from the installment point and confirming the accuracy using a blackbody furnace and a reference radiation thermometer is needed. It is desirable to set a plurality of temperature points to the blackbody furnace representing temperatures to be measured, however, a certain amount of time is needed to carry out this checking work to many radiation thermometers, thereby cost for the checking also increases. Also, it is difficult to complete the checking work to all radiation thermometers in a short maintenance term of the continuous caster. Considering this, it is presumed that nearly same numbers of extra radiation thermometers as the radiation thermometers that are actually installed are needed, therefore cost becomes further increased.

<problem in a case where nozzles are made to be closer to surface of cast slab>

There is a problem caused by a structure of vertical bending type of a continuous caster of recent years. In a continuous caster of a vertical bending type, a dummy bar (a plurality of blocks made by steel connected to one another) is disposed inside before casting is started to be used as a bottom cap when the casting is started. At the same time of starting of casting, the dummy bar has a role to lead pulling out of a cast slab downward. When the dummy bar leads pulling out, a strong tension is applied to the dummy bar by a pinch roll. In a bending part of the continuous caster, the dummy bar passes the part bending at an axis of a connecting portion of the blocks. Because of this, sometimes the bent portion of the dummy bar widely deviates outside from the external tangent line of adjacent support rolls (external tangent line on a side of cast slab). Therefore, if the nozzles for purge air are projected to near the surface of the cast slab, the dummy bar possibly hits the nozzles. If the dummy bar hits the nozzles, by being caught up in the support rolls, the nozzles bend and thereby the radiation thermometer gets broken, or the bent nozzles damage the support rolls and the damage is sometimes transferred to the cast slab. This makes a great negative effect to a quality and productivity of the cast slab.

As a provision of preventing collision of the dummy bar and the nozzles, it is considered to provide a moving structure to evacuate the nozzles. However, since inside of the continuous caster is hot and humid, such a moving structure easily gets broken, thereby it is difficult to stably use the structure for a long period of time. Also, installation of a large moving structure in Which an sufficient provision is given for preventing breakdown is sometimes difficult considering space, or possibly disturbs maintenance capacity and the like of the continuous caster.

Considering different problems as described above, for example, Patent Document 1 suggests a surface temperature measuring apparatus of slab comprising a first pipe in which an optical fiver is inserted and a space formed by covering a backward portion of the first pipe by a second pipe to circulate cooling water (claims of Patent Document 1). Then, Patent Document 1 describes that the backward portion of the first pipe is connected to a compressed air source and air sent from the backward are jetted from a top end of the first pipe. (Patent Document 1, the second page, left column, line 16 to right column, line 8). It is also described that a copper pipe having good heat conductivity is inserted to an inner surface of top end of the first pipe (Patent Document 1, second page, left column, line 9 to line 15). Further, it is described that by inserting a thin portion that is configured only by the first pipe to a gap between support rolls of the continuous caster to circulate cooling water in the space, it is possible to cool to the top end of the first pipe, therefore it is possible to protect the optical fiber from heat, and by jetting air from the top end of the first pipe, it is possible to prevent ingress of water drops, and at the same time, since water vapor existing in sight is blown away to open the sight, it is also possible to certainly enter the thermal radiation light radiated from the surface of the slab to the top end of the optical fiber (Patent Document 1, second page, left column, line 19 to right column, line 8).

However, the apparatus described in Patent Document 1 is an apparatus to measure a surface temperature at only one point of a cast slab, therefore it is not an apparatus that resolves the problems accompanied with the temperature measurement at many points described above. Also, when the invention described in Patent Document 1 was made, main stream type of the continuous caster was of a vertical type or a bending type, and pass lines of cast slab make a straight line or a curve having a constant curvature. Therefore, it is presumed that there has not been considered of clash of nozzles for purge air and a dummy bar at all.

Also, Patent Document 2 suggests a cooling control method of a continuous cast comprising the steps of, in a secondary cooling zone of a continuous cast equipment, detecting a temperature distribution in a width direction on a surface by a temperature measurement structure in the width direction of a cast slab, carrying out adjustment of flow amount of cooing water automatically by a flow amount adjustment structure via an arithmetic device that controls the temperature distribution in the width direction on the surface to correspond to an intended temperature, thereby controlling temperature of the cast slab (Patent Document 2, claim 1). In Patent Document 2, there is no description of configuration of the thermometer itself. Intended continuous caster of the method described in Patent Document 2 is of a bending type, and a correction point of the cast slab is only one point at a horizontal pass line close to the end of process in a casting direction (Patent Document 2, FIG. 1 and the like). A thermometer is disposed to the correction point, and moving the thermometer in the width direction of the cast slab by using the temperature measurement structure, the temperature distribution in width direction on the surface is measured (Patent Document 2, second page, left below column, line 3 to right below column, line 8).

However, the method described in Patent Document 2, in the same manner as in the case where a moving structure to evacuate the nozzles as described is disposed, has problems of breakdown and having a large space, since a structure to move the thermometer in the width direction is installed. Specifically, in a case where a surface temperature of cast slab is measured in a continuous caster of a vertical bending type, if such a structure is installed to a vertical pass line, it is considered that stable operation of the structure is further disturbed since the structure is subjected to cooling water including foreign substance such as a large amount of oxide scale peeled off from a surface of the cast slab.

Patent Document 3 suggests a cooling apparatus installed inside a roller apron to cool a camera type thermometer for slab surface that measures a temperature of slab surface, wherein a water cooling jacket is provided to a circuit of the camera type thermometer for slab surface, a skirt having a folding-fan shape is provided to a lower portion of the water cooling jacket, an air spray nozzle having a ring shape and many jet holes on side surface and lower surface is provided on the upper side of the camera type thermometer for slab surface in the water cooling jacket, and an air spraying device formed by a member having a shape of straight line attached to one side of the skirt and located inside the skirt, the air spraying device forming an air membrane laterally or obliquely downward (Patent Document 3, claim 1). According to this cooling apparatus, since the camera type thermometer for slab surface is equally cooled efficiently, which eliminates a negative pressure, it is possible to inhibit taking in of water vapor from the slab surface, and since the water vapor coming from the slab is removed and sight of the camera type thermometer for slab surface is secured, radiation heat from the slab also can be inhibited (Patent Document 3, second page, left column, line 24 to line 34).

However, although the skirt described in Patent Document 3 can be applied at a pass line which is nearly in a horizontal position where the camera type thermometer sees downward, in a case where the pass line is vertical in a continuous caster of a vertical bending type, that is, a surface of cast slab is nearly in a vertical position, and a direction of air purge is nearly horizontal, a large amount of water flows in a time period from before the casting is started till the very first stage after the casting is started and the like, and neighborhood of the skirt is in a state being nearly sunk in water. At that time, if such a large skirt having a folding-fan shape as described in Patent Document 3 is used, uniformity in flow amount of air is disrupted and there is a high possibility of taking in water into the skirt from some part. Also, sometimes there is no space to install such a large skirt.

Also, Patent Document 4 suggests a surface temperature measuring method of cast slab in a continuous caster by means of a radiation thermometer, the method comprising measuring a surface temperature of cast slab by the radiation thermometer in a state that spray of a second cooling water to an intended area of temperature measurement on the surface of cast slab is temporarily stopped to thereby inhibit generation of water vapor from the second cooling water in the intended area of temperature measurement on the surface of the cast slab (Patent Document 4, claim 1).

However, in the method described in Patent Document 4, since spray of cooling water is temporarily stopped when temperature measurement is carried out, amount of heat extraction from the surface of the cast slab is largely different between when the temperature measurement is carried out and when the temperature measurement is not carried out, and there is a possibility that the surface temperature of the cast slab is high when the temperature measurement is carried out. The temperature difference between when the temperature measurement is carried out and when the temperature measurement is not carried out differs depending on different conditions. That is, representativeness of values of temperature measurement is vitiated. Also, nowadays, a method to strongly cool a cast slab at a most upper portion of a continuous caster and the like have been developed, and in an area where some of a large amount of cooling water used at the most upper portion (pass line nearly in a vertical position), water that influences value of temperature measurement cannot be sufficiently eliminated only by temporarily stopping the spray of cooling water between specific support rolls, and sometimes conditions cannot be satisfied to enable the measurement.

CITATION LIST

Patent Literatures

Patent Document 1: Japanese Patent Application Laid-Open Publication No. S58-90362
Patent Document 2: Japanese Patent Application Laid-Open Publication No. S54-32130
Patent Document 3: Japanese Examined Utility Model Application Publication No. H06-12508
Patent Document 4: Japanese Patent Application Laid-Open Publication No. 2009-195959

SUMMARY OF THE INVENTION

Problems to be Solved by the Invention

The present invention has been made with consideration of such conventional techniques, and an object of the present invention is to provide a method for measuring surface temperatures of a plurality of points of a cast slab at a secondary cooling zone of a continuous caster including a vertical bending type, with a good accuracy and at low cost.

Means for Solving the Problems

In order to solve the above problems, the inventors of the present invention have been carried out an intensive study. As a result of the study, in order to reduce influence from water existing in a light path in between a cast slab and a radiation thermometer, they decided to employ a configuration to receive a thermal radiation light from a cast slab via a socalled air column thermometer, in other words, via an air column formed by purge air. They have found out that, at this time, by making an inner cross section of a nozzle to spray purge air (having a function of containing one end of an optical fiber that receives a thermal radiation light from cast slab) substantially circular in shape to uniform a flow speed distribution of the air, and making an inner diameter of the circular shape 30 mm or less, the possibility of ingress of water into the nozzle when casting is started and the like is reduced. However, they also have considered that, if the inner diameter of the nozzle is less than 5 mm, a clearance between a sight of the optical fiber and the inner diameter becomes very small, therefore the sight can be narrowed because of error in installment of the optical fiber, vibration, thermal fluctuation and the like. They also found out that by installing the nozzle between support rolls that support the cast slab, such that a top end of the nozzle is located on a side farther from the surface of the cast slab than a central axis of each of the support rolls, it is possible to surely prevent contacting of the nozzle and a dummy bar. They also found out that, by receiving a thermal radiation light from the cast slab at one ends of a plurality of optical fibers, and other ends of the plurality of optical fibers are gathered in a bundle, then taking images of the other ends of the gathered plurality of optical fibers with a two-dimensional or one-dimensional imaging method (an imaging method(s) less in its numbers than the numbers of the optical fibers), based on a pixel density of taken image of the other end of each of the optical fibers, it is possible to measure surface temperatures of a plurality of points on the cast slab easily and at low cost. At this time, they found out that, since it is concerned that an amount of heat radiation light transmitted at clad of the optical fiber changes depending on influences of curve in the optical fiber and the like, the surface temperature should be calculated not based on a whole image of the other end of the optical fiber, but based on a pixel density of a core image from core at which the thermal radiation light is stably transmitted.

The present invention has been made based on the above findings from the inventors of the present invention. Namely, the present invention is a method for measuring a surface temperature of cast slab at a secondary cooling zone of a continuous caster, the method comprising the steps of: inserting one end of each of a plurality of optical fibers to a plurality of nozzles each having an inner cross section substantially circular in shape and a plurality of heat-resistant tubes each connected to each of the nozzles such that a light axis of each of the optical fibers each substantially coincides with a central axis of each of the nozzles, and installing a plurality of the nozzles such that each of the nozzles is located between support rolls that support the cast slab; while spraying purge air from each of the nozzles toward a surface of the cast slab, receiving a thermal radiation light from the cast slab at the one end of each of the optical fibers via an air column formed by the purge air; gathering other end of each of the optical fibers in a bundle in a housing communicated with each of the tubes, thereby taking images including core images of the other ends of the optical fibers gathered in a bundle by using a two-dimensional or one-dimensional imaging means; and calculating a surface temperature of an area on the cast slab corresponding to each of the core images based on a pixel density of each of the core images in the taken images.

According to the present invention, since the thermal radiation light of the cast slab is received via the air column, it is possible to reduce influence from water existing in the light path. Further, it is possible to measure surface temperatures of a plurality of points of the cast slab easily at low cost. Therefore, according to the present invention, it is possible to measure surface temperatures of a plurality of points of a cast slab at a secondary cooling zone of a continuous caster including a vertical bending type, with a good accuracy and at low cost.

In the present invention, it is preferable to use the nozzles each having an inner diameter of 5 mm to 30 mm.

According to this favorable embodiment, a possibility of ingress of water into the nozzles is reduced.

In the present invention, it is preferable to install the nozzles such that a top end of each of the nozzles is located on a side farther from the surface of the cast slab than a central axis of each support roll.

According to this preferable embodiment, it is possible to surely prevent contacting of the nozzles and a dummy bar.

In the present invention, as described in Japanese Patent Application No. 2012-116771 that the applicant of the present invention has been filed, it is preferable to adjust a flow amount of the purge air such that a diameter of the air column at a portion having contact with the surface of the cast slab is 30 mm to 40 mm.

According to this preferable embodiment, by making the diameter of the air column at the portion having contact with the surface of the cast slab 30 mm to 40 mm, it is possible to reduce influence from water existing in the light path, without disturbing cooling of the cast slab in a continuous caster. In order to make the diameter of the air column at the portion having contact with the cast slab 30 mm to 40 mm, the flow amount of purge air can be adjusted corresponding to a distance between the top end of each of the nozzles and the surface of the cast slab.

In the present invention, it is preferable to install the housing outside a chamber in which the support rolls are arranged, and to make inside of the nozzles, the tubes and the housing in a state of positive pressure.

According to this preferable embodiment, ingress of water and dust into the nozzles, the tubes and the housing that can cause error in temperature measurement or breakdown is effectively prevented and it is possible to efficiently cool their insides.

In the present invention, it is preferable to detect a central pixel of each core image in the images taken by the above imaging means, and based on a average pixel density near the central pixel of each core image, to calculate the surface temperature of the area of the cast slab corresponding to each core image.

According to this preferable embodiment, since the surface temperature is calculated based on the pixel near the central pixel in each of the core images, it is possible to further reduce influence from the thermal radiation light transmitted in the clad. Also, since the surface temperature is calculated based on the average pixel near the central pixel in each of the core images, it is possible to reduce influence from variability in sensitivity of imaging device (CCD or the like) of the imaging means.

In the present invention, it is preferable to calculate a background density based on the pixel density of pixel area other than the pixel area of the image of the other end of the optical fiber in the image taken by the above imaging means, to subtract the calculated background density from the pixel density of each of the core images, and after that, to calculate the surface temperature of the area of the cast slab corresponding to each of the core image based on the pixel density of each of the core images after subtraction.

In the pixel density of the pixel area other than that of the image of the other end of each of the optical fibers, a stray light being a thermal radiation light from another optical fiber, and a pixel density caused by noises included in imaging device and signal processing system of the imaging means and the like. This pixel density is considered to be also included in the pixel density of each of the core images. Because of this, as the above favorable embodiment, by calculating the background density based on the pixel density of the pixel area other than that of the image of the other end of each of the optical fibers, and subtracting the calculated background density from the pixel density of each of the core images, the pixel density of each of the core images after subtraction is a pixel density corresponding to only light amount of the thermal radiation light transmitted in the core. Therefore, it can be expected that the surface temperature can be calculated with a much better accuracy.

Here, depending on the surface temperature of the cast slab, the light amount of the thermal radiation light from the cast slab differs widely. For example, in a case where the surface temperature differs in a range of 600° C. to 1000° C., as a dynamic range in which the thermal radiation light is detected, a dynamic range of around $1 \times 10^5$ is needed. Considering a case where a CCD is used as an imaging device of the imaging means, a dynamic range of detection light amount effective to CCD is normally decided by a capacity of its resister as a quantum well (an amount of electric charge that can be stored after photoelectric conversion), and effective number of bit by which a stable output can be obtained is around 8 bits (256) to 10 bits (1024), which falls short of the above range. Therefore, in order to measure a surface temperature in a wide range, it is needed to take images with different conditions of combination of exposure time and gain.

Therefore, in the present invention, it is preferable to set a plurality of conditions of combination of exposure time and gain of the above imaging means in advance, then to take images more than once including the core images of the other ends of the optical fibers gathered in a bundle, by repeating the set conditions periodically in series, after that, to select an image whose pixel density is in a predetermined range, by each of the core images, from the plurality of taken images, and to calculate the surface temperature of the area of the cast slab corresponding to each of the core images based on the pixel density of each of the core images in the selected image.

According to this favorable embodiment, images including the core images of the other ends of optical fibers are taken more than once by periodically repeating the predetermined conditions of combination of exposure time and gain of the imaging means. The conditions of combination of exposure time and gain of the imaging means can be set in advance corresponding to a range of the surface temperature of the cast slab to be measured. Because of this, an image taken with an adequate condition of combination of exposure time and gain of the imaging means for the surface temperature of the cast slab to be measured is included in the plurality of taken images. In the above favorable embodiment, from the plurality of the taken images, images in which the pixel density of each of the core images is in a predetermined range (for instance, when an imaging means of 8 bits is used, a pixel density of 50 to 200) are selected by each of the core images, and the surface temperature of the area of the cast slab corresponding to each of the core images is calculated, based on the pixel density of each of the core images in the selected images. Because of this, it is expected that an adequate pixel density corresponding to light amount of the thermal radiation light from the cast slab can be obtained, thereby it is possible to measure the surface temperature of the cast slab with a good accuracy.

In the present invention, it is preferable to dispose an optical filter that transmits only light having shorter wave length than 0.9 μm between a lens and the imaging device of the above imaging means, and to take images of the light transmitted the optical filter by the above imaging means.

According to the above favorable embodiment, even when water exists on the surface of the cast slab, it becomes easy to inhibit error in temperature measurement.

Also, in order to solve the above problems, the present invention is an apparatus for measuring a surface temperature of cast slab at a secondary cooling zone of a continuous caster, the apparatus comprising: a plurality of nozzles each installed in a manner to be located between support rolls that support the cast slab, which nozzles each has an inner cross section of substantially circular in shape and sprays purge air toward the surface of the cast slab; a plurality of heat-resistant tubes each connected to each of the nozzles; a plurality of optical fibers, each one end thereof is inserted to each of the nozzles and each of the tubes such that a light axis of each of the optical fibers substantially coincides with a central axis of each of the nozzles, which optical fibers each receives a thermal radiation light from the cast slab at each one end thereof via an air column formed by the purge air; a housing communicated with each of the tubes, the housing in which other ends of the optical fibers are gathered in a bundle are disposed; an imaging means disposed in the housing, which image means takes two-dimensional or one-dimensional images including core images of other ends of the optical fibers gathered in a bundle; and a computing means to calculate a surface temperature of an area of the cast slab corresponding to each of the core images based on a pixel density of each of the core images in the taken images.

According to the apparatus for measuring surface temperature of cast slab of the present invention, since the thermal radiation light from the cast slab is received via the air column, it is possible to reduce influence from water existing in the light path. Further, it is possible to measure surface temperatures of a plurality of points on the cast slab easily and at low cost. Therefore, according to the apparatus for measuring surface temperature of the present invention, it is possible to measure the surface temperatures of the plurality of the points on the cast slab at a secondary cooling zone of a continuous caster including a vertical bending type, with a good accuracy and at low cost.

In the apparatus for measuring surface temperature of cast slab according to the present invention, it is preferable that an inner diameter of each of the nozzles is 5 mm to 30 mm.

According to this favorable embodiment, a possibility of ingress of water into the nozzle is reduced.

In the apparatus for measuring surface temperature of cast slab according to the present invention, preferably the nozzle is installed such that a top end thereof is located on a side farther from the surface of the cast slab than a central axis of each of the support rolls.

According to this favorable embodiment, contacting of the nozzle and a dummy bar can be certainly prevented.

In the apparatus for measuring surface temperature of cast slab according to the present invention, as described in the specification of Japanese Patent Application No. 2012-116771, it is preferable that a diameter of the air column at a portion having contact with the surface of the cast slab is 30 mm to 40 mm.

According to this favorable embodiment, it is possible to reduce influence from water existing in the light path, without interrupting cooling of the cast slab in the continuous caster. In order to make the diameter of the air column at the portion having contact with the surface of the cast slab 30 mm to 40 mm, a flow amount of the purge air can be adjusted corresponding to a distance between the top end of each of the nozzles and the surface of the cast slab.

In the apparatus for measuring surface temperature of cast slab according to the present invention, it is preferable that the housing is installed outside a chamber in which the support rolls are arranged, and inside of each of the nozzles, each of the tubes and the housing are in a state of positive pressure.

According to this favorable embodiment, ingress of water and dust into the inside of each of the nozzles, each of the tubes and the housing that can cause error in temperature measurement and breakdown is effectively prevented, and it is possible to efficiently cool their insides.

In the apparatus for measuring surface temperature of cast slab according to the present invention, it is preferable that an optical filter that transmits only light having shorter wavelength than 0.9 μm is disposed between a lens and an imaging device of the imaging means.

According to this favorable embodiment, even when water exists on the surface of the cast slab, it becomes easy to inhibit error in temperature measurement.

Effects of the Invention

According to the present invention, it is possible to measure a surface temperatures of a plurality of points of a cast slab at a secondary cooling zone of a continuous caster including a vertical bending type, with a high accuracy and at low cost.

BRIEF DESCRIPTION OF THE DRAWINGS

FIG. 8 is a view showing a brief structure of a chamber;

MODES FOR CARRYING OUT THE INVENTION

Figure 1A:
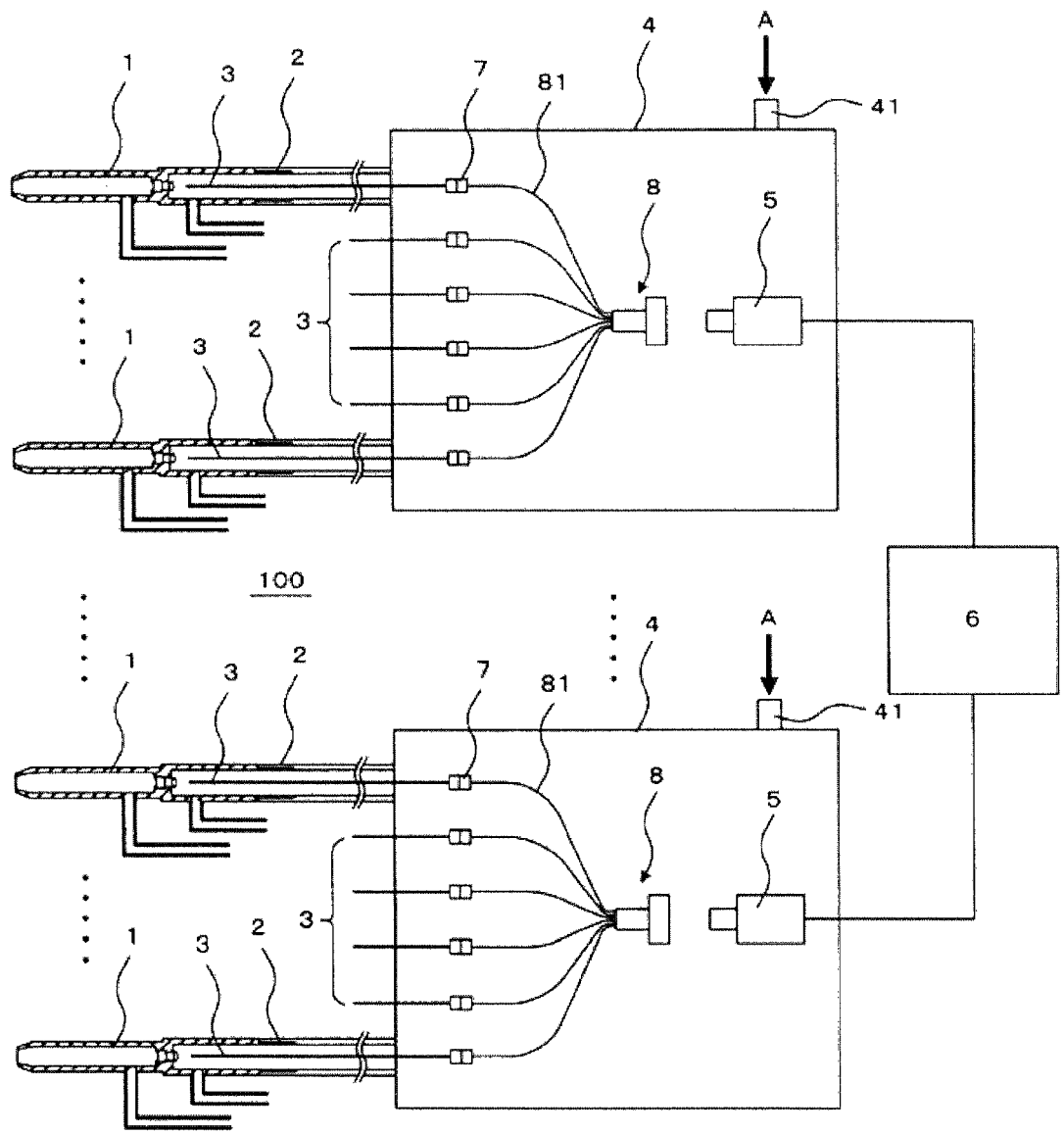
FIG. 1A is a view showing a brief structure of a surface temperature measuring apparatus according to one embodiment of the present invention.
Figure 1B:
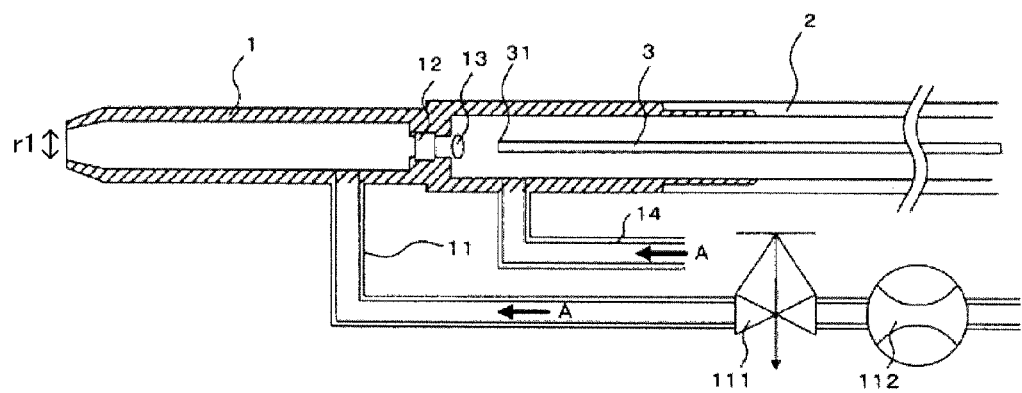
FIG. 1B is an enlarged view of a nozzle and the neighborhood of the nozzle of the surface temperature measuring apparatus shown in FIG. 1A.
Figure 2A:
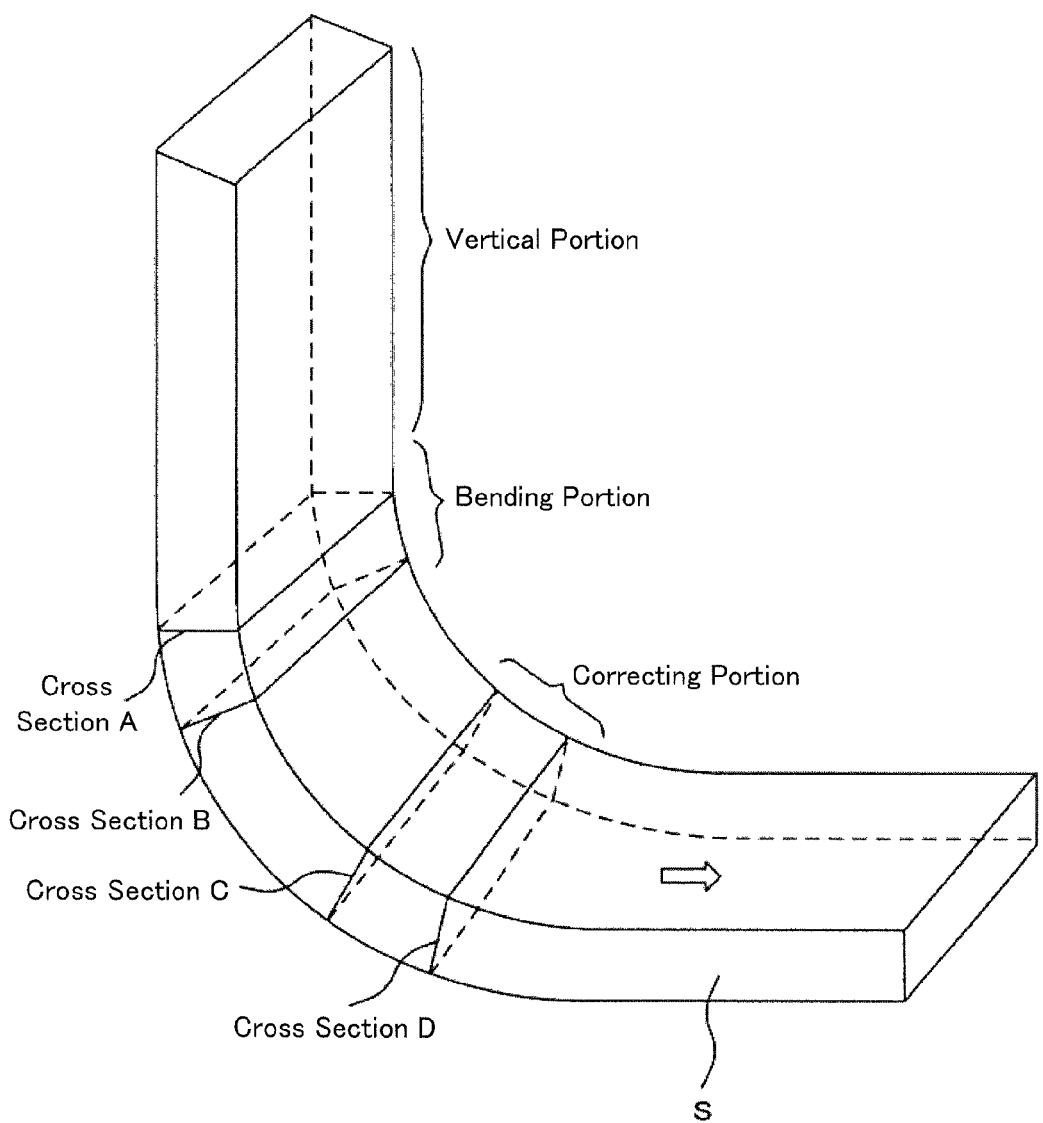
FIG. 2A is a view to illustrate points where a surface temperature of a cast slab is measured by the surface temperature measuring apparatus shown in FIG. 1A, a view showing an entire body of the cast slab.
Figure 2B:
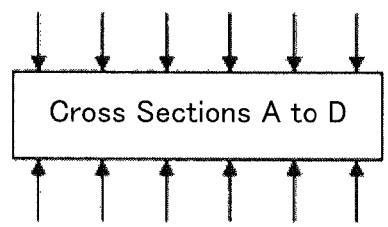
FIG. 2B is a view showing points where the surface temperature of the cast slab is measured by the surface temperature measuring apparatus shown in FIG. 1A.
Figure 2C:
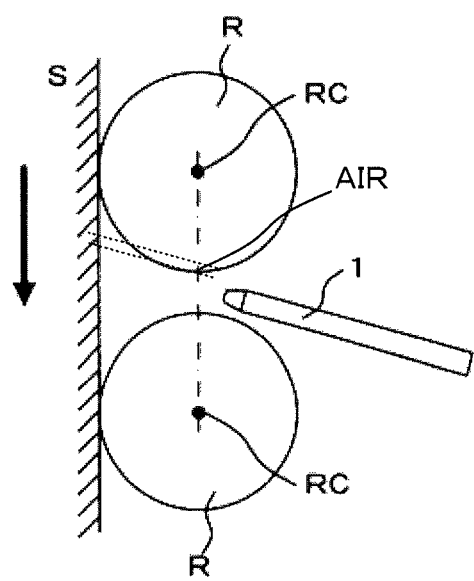
FIG. 2C is a view showing an installment point of the nozzle of the surface temperature measuring apparatus shown in FIG. 1A.

Hereinafter, with reference to the accompanying drawings, one embodiment of the present invention will be described. FIG. 1A is a view showing a brief structure of entirety of a surface temperature measuring apparatus of cast slab according to one embodiment of the present invention, and FIG. 1B is an enlarged view of a nozzle and the neighborhood of the nozzle of the surface temperature measuring apparatus shown in FIG. 1A. FIG. 2A is a view to describe points where the surface temperature of the cast slab is measured by the surface temperature measuring apparatus shown in FIG. 1A, a view showing an entire body of the cast slab. FIG. 2B is a view showing points where the surface temperature of the cast slab is measured by the surface temperature measuring apparatus shown in FIG. 1A. FIG. 2C is a view showing an installation point of the nozzle of the surface temperature measuring apparatus shown in FIG. 1A, and FIG. 2C also shows an air column ("AIR" in FIG. 2C) formed by purge air sprayed from the nozzle. Here, in FIGS. 1B and 2C, a state when the step of "inserting one end of an optical fiber to a nozzle whose inner cross section is substantially circular in shape and a heat-resistant tube connected to the nozzle such that a light axis of the optical fiber substantially coincides with a central axis of the nozzle, and installing a plurality of the nozzles such that each of the nozzles is located between support rolls that support the cast slab" in the method for measuring surface temperature of cast slab of the present invention is finished is also shown. Also, in FIG. 2C, a state when the step of "while spraying purge air from each of the nozzles toward a surface of the cast slab, receiving a thermal radiation light from the cast slab at the one end of each of the optical fibers via an air column formed by the purge air" in the method for measuring surface temperature of cast slab of the present invention is also shown. Also, in FIG. 1A, a state of "gathering other end of each of the optical fibers in a bundle in a housing communicated with each of the tubes" in the step of "gathering other end of each of the optical fibers in a bundle in a housing communicated with each of the tubes, thereby taking images including core images of the other end of each of the optical fibers gathered in a bundle by using a two-dimensional or one-dimensional imaging means" is also shown. As shown in FIG. 1A, a surface temperature measuring apparatus 100 according to the present invention comprises a plurality of nozzles 1, each nozzle 1 spraying purge air toward a surface of a cast slab S, a plurality of heat-resistant tubes 2, each heat-resistant tube 2 (hereinafter, sometimes referred to as "flexible tube 2") being connected to each of the nozzles 1, a plurality of optical fibers 3, each optical fiber 3 receiving a thermal radiation light from the cast slab S, a housing 4 communicated with each of the flexible tubes 2, an imaging means 5 that takes two-dimensional or one-dimensional images, and a computing means 6 to calculate the surface temperature of the cast slab S. In this embodiment, as shown in FIG. 2A, with regard to cross sections A, B of two points of the cast slab S located to a bending part and cross sections C, D of two points of the cast slab S located to a correcting part in a secondary cooling zone of a continuous caster, measurement is carried out at six points each, and on both sides (points shown by arrows in FIG. 2B), therefore at 48 points in total. That is, the nozzles shown in FIGS. 1A and 1B are disposed at the 48 points in total on the surface of the cast slab S facing to one another.

The nozzle 1 is made to have an inner cross section of substantially circular in shape, and an inner diameter r1 of the nozzle 1 is 5 mm to 30 mm (in this embodiment, the inner diameter r1=10 mm, and an outer diameter of 15 mm). In the nozzle 1, dried compressed air A is introduced via a pipe 11, and purge air is sprayed from a top end of the nozzle 1. As shown in FIG. 1B, a flow control valve 111 and a flow monitor 112 are attached to each pipe 11 that introduces the compressed air A to each nozzle 1. This makes it possible to adjust flow amount of the compressed air A introduced to each nozzle 1 separately. An advantage of being capable of adjusting flow amount of the compressed air A introduced to each nozzle 1 separately is as follows. As mentioned above, a large amount of cooling water flows in a time period from before casting is started and till very early stage after the casting is started and the like. Each nozzle 1 is disposed to different position to one another, there is a case in which one of the nozzles 1 exposed to the large amount of cooling water (hereinafter referred to as "nozzle A"), and another one of the nozzles 1 exposed only to little amount of cooling water (hereinafter referred to as "nozzle B") exist together. Of course, one of the nozzles 1 in a state of the middle of the nozzle A and nozzle B possibly exists as well. In a case where the flow control valve 111 and the flow monitor 112 are not attached to each of the pipes 11 and only total flow amount of the compressed air A introduced to each nozzle 1, balance between a flow amount of the compressed air A introduced to the nozzle A and a flow amount of the compressed air A introduced to the nozzle B is changed to lower the flow amount of the compressed air A introduced to the nozzle A, thereby there is a possibility of ingress of cooling water with dust such as scales into the nozzle A. As a result of this, an optical window 12 built in the nozzle A described below can get dirty, or dirt can pile up inside the nozzle A, which disturbs detection of the thermal radiation light. Because of this, a gross error can occur in temperature measured through the optical fiber 3 inserted in the nozzle A, or sometimes temperature measurement cannot be carried out. Against to this, by making it possible to adjust the flow amount of the compressed air A introduced to each nozzle 1 by attaching the flow control valve 111 and the flow monitor 112 to each nozzle 1, it is possible to avoid such problems. As shown in FIG. 2C, the nozzle 1 is installed between support rolls R that support the cast slab S such that a top end of the nozzle 1 is located farther from the surface of the cast slab S than a central axis RC of each of the support rolls R. A diameter of the air column formed by the purge air sprayed from the nozzle 1 at a portion having contact with the surface of the cast slab S (diameter of the air column S) is set to be 30 mm to 40 mm by adjusting the flow amount of the compressed air A introduced via the pipe 11.

The flexible tube 2 is a heat-resistant flexible tube made of stainless steel and the like and has a role of protecting the optical fiber 3 from heat, shock, dust, water and the like. In the flexible tube 2 and the nozzle 1, the dried compressed air A is introduced via a pipe 14 communicated with the nozzle 1, and this makes a state of positive pressure inside the flexible tube 2 and the nozzle 1. Because of this, ingress of water and dust into the flexible tube 2 and the nozzle 1 that can cause error in temperature measurement and breakdown is effectively prevented, and at the same time it is possible to efficiently cool their insides.

One end of each of the optical fibers 3 is inserted to each nozzle 1 and each flexible tube 2 such that a light axis (central axis) of each optical fiber 3 substantially coincides with a central axis of the nozzle 1. Also, an optical window 12 and a lens (a convex lens) 13 are built in the nozzle 1. The optical fiber 3 receives the thermal radiation light from the cast slab S at the one end thereof 31 via the air column formed by the purge air, the optical window 12 and the lens 13. As the lens 13, a lens having its sight at the top end of the nozzle 1 smaller than the inner diameter of the nozzle 1 (for example, about 5 mm), and having a focal distance that does not unnecessarily widen the sight to the surface of the cast slab S is chosen.

As the optical fiber 3, for example, an optical fiber made of quartz, which optical fiber has a core diameter of 400 μm, a clad diameter of 500 μm and a fiber diameter of 4 mm can be employed. Both ends thereof are grinded to have a flat surface or a convex surface. An optical fiber that has a large core diameter receives a lot of thermal radiation light to contribute to lower a lower limit of value of temperature measurement, on the other hand, since it is weak to bending, care is needed in installment. As a covering material for an outer surface of the optical fiber, a material having a heat resistance of 100° C. or more, for example, a material having a heat resistance of 150° C. can be applied.

A housing 4 is installed outside a chamber (strand chamber) in which the support rolls R disposed to a bending part and a correcting part of the continuous caster are arranged. FIG. 8 shows a brief structure of a chamber X. For easy understanding of the structure of the chamber X, description of repeated symbols are partly omitted, and the nozzles 1 are shown by straight arrows in FIG. 8. Also, in FIG. 8, the housing 4 is shown being simplified. The chamber X is a member made of metal and covering surrounding of the support rolls R, the cast slab S and the like. A space surrounded by the chamber X is in a hot environment because of a radiation heat from the cast slab S. Further, since cooling water sprayed from a cooling spray Y toward the cast slab S has contact with the cast slab S and evaporates thereby a large amount of water vapor is generated, the space surrounded by the chamber X is also in a humid environment. The water vapor in the chamber X is ejected to outside of the chamber X by an ejecting means that is not shown. As shown in FIG. 8, in the space surrounded by the chamber X, the nozzles 1 are disposed, and each nozzle 1 is connected to the housing 4 disposed outside of the chamber X via the flexible tube whose description is omitted in FIG. 8. Going back to FIG. 1A, description will be continued. In the housing 4, the dried compressed air A is introduced via a pipe 41, which makes inside of the housing 4 in a state of positive pressure. In the housing 4, the other end of each of the optical fibers 3 is gathered in a bundle and disposed. Specifically, in this embodiment, a FC connector 7 and a bundle fiber 8 are employed. The FC connector 7 is connected to the other end of each optical fiber 3. Optical fibers 81 configuring a bundle fiber 8 each has a core diameter of 400 µm, a clad diameter of 500 µm, which are same as that of the optical fiber 3, and one ends are each separated from one another, and the only other ends are bundled. Both sides of each of the optical fibers 81 are grinded to have a flat face or a convex face. The optical fibers 81 configure the bundle fiber 8, and the one end of each of the optical fibers 81 separated to one another is linked to the other end of each of the optical fibers 3 by the FC connector 7. The one end of each optical fiber 81 and the other end of each optical fiber 3 are grinded to have a flat face or a convex face, therefore transmitting loss in the FC connector 7 is inhibit to be 1% to 2%, which hardly affects the value of temperature measurement. It should be noted that, in this embodiment, as a means to gather the other ends of the optical fibers 3 in a bundle, the FC connector 7 and the bundle fiber 8 are employed, however, the present invention is not limited to this. For example, the other ends of the optical fibers 3 can be gathered in a bundle by fixating them by metal, resin or the like.

Figure 9:
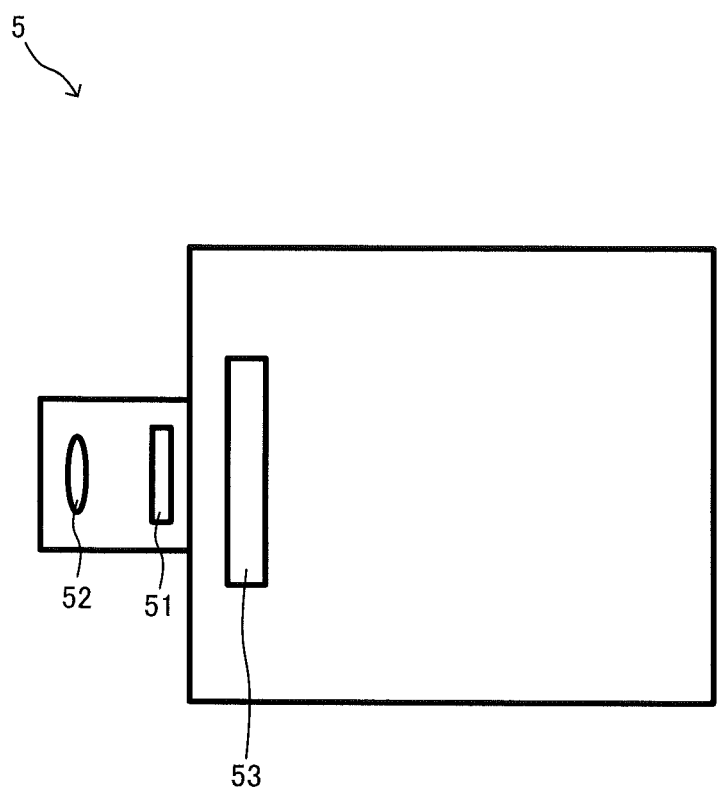
FIG. 9 is a view showing a disposition example of the optical filter that transmits only light having shorter wavelength than 0.9 μm disposed between the lens and the imaging device of the imaging means shown in FIG. 1A.

As the imaging means 5, a two-dimensional CCD camera, a two-dimensional CMOS camera, a CCD line sensor, a CMOS line sensor and the like can be employed. In this embodiment, as the imaging means 5, a two-dimensional CCD camera is employed. Especially, in this embodiment, as a favorable configuration, a two-dimensional CCD camera that can control its exposure time (shutter speed) and gain is employed. The imaging means 5 is disposed in a manner to take images including a core image of the other end of each of the optical fibers 3 gathered in a bundle. In this embodiment, the imaging means 5 is disposed in a manner to take images including a core image of the other end of the optical fiber 81 that configures the bundle fiber 8. Specifically, the imaging means 5 is disposed such that core images of the other ends of the plurality of the optical fibers 81 (in this embodiment, six optical fibers 81) are in one imaging sight of the imaging means 5. Also, an optical filter that transmits only light having wavelength shorter than 0.9 µm is disposed between a lens and an imaging device of the imaging means 5. This makes it possible to inhibit error in temperature measurement due to absorption of thermal radiation light by water existing between the one end of the optical fiber 3 and the cast slab S. Thermal radiation light to be detected forms an image on the imaging device of the imaging means 5 via the optical fiber 3, the bundle fiber 8 and the optical filter mentioned above. FIG. 9 shows a disposition example of the optical filter to be disposed between the lens and the imaging device of the imaging means 5. As shown in FIG. 9, an optical filter 51 that transmits only light having wavelength shorter than 0.9 µm is disposed between a lens 52 and an imaging device 53.

Imaging magnification of the imaging means 5 is, as described above, set such that core images of the other ends of the plurality of the optical fibers 81 (in this embodiment, 6 optical fibers 81) are in one imaging sight of the imaging means 5. Further, in this embodiment, in order to calculate an average pixel density of neighborhood of a central pixel in the core image, as described below, the imaging magnification of the imaging means 5 is set such that a plurality of pixels (preferably, 9 or more of pixels) are included in the core image.

A computing means 6 calculates a surface temperature of an area of the cast slab corresponding to each core image, based on the pixel density of each core image in the images taken by the imaging means 5. Specifically, the computing means 6 is configured with a personal computer in which a software to carry out a predetermined image processing described later to the taken images and to carry out a predetermined arithmetic processing to a result of the image processing to thereby calculate the surface temperature is installed.

Hereinafter, a method for measuring surface temperature of the cast slab S by the surface temperature measuring apparatus 100 having the above configuration will be specifically described.

Figure 3A:
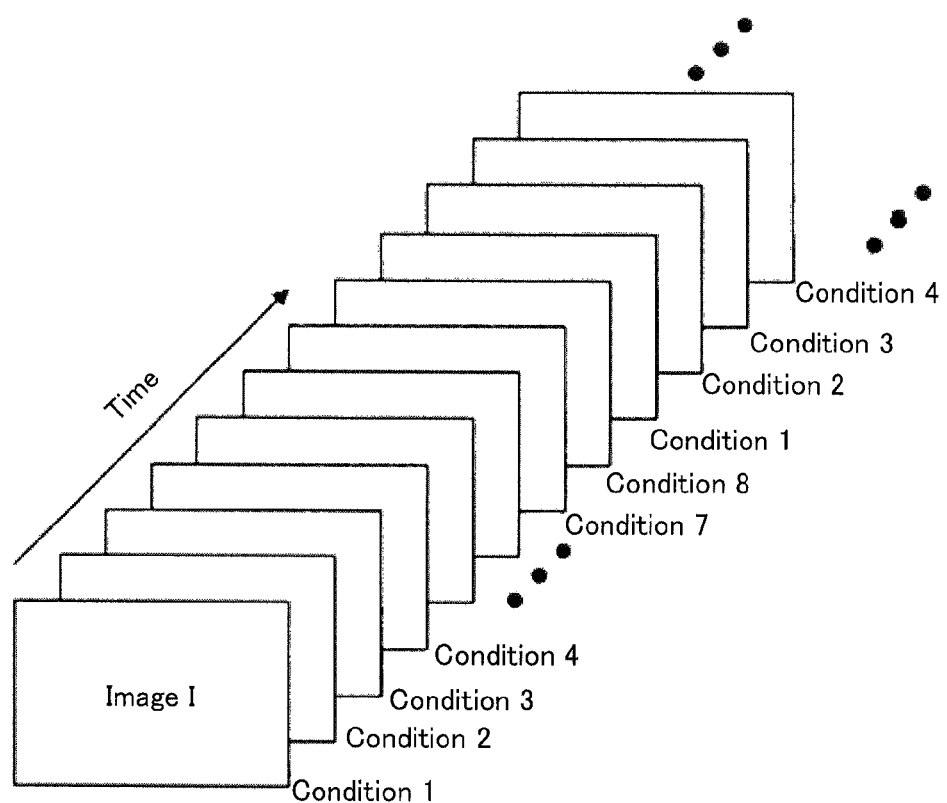
FIG. 3A is a view illustrating contents of image processing that a computing means shown in FIG. 1A carries out.
Figure 3B:
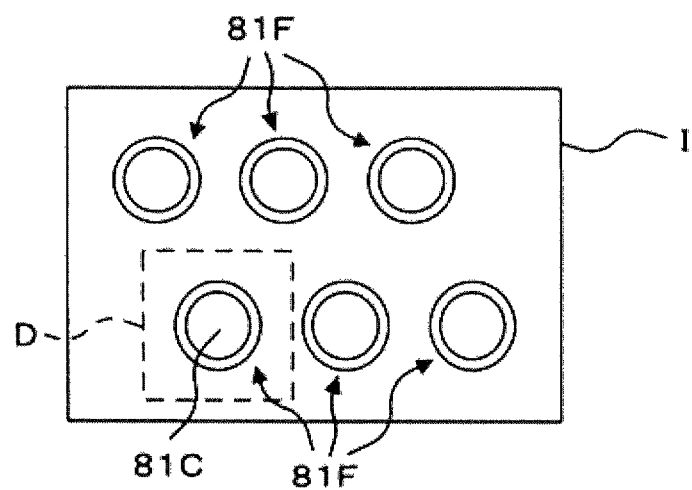
FIG. 3B is a view illustrating the contents of the image processing that the computing means shown in FIG. 1A carries out.
Figure 3C:
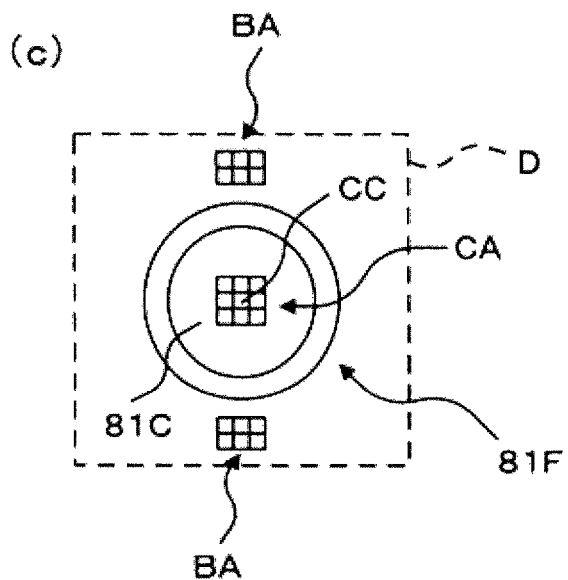
FIG. 3C is a view illustrating the contents of the image processing that the computing means shown in FIG. 1A carries out.

FIG. 3A to FIG. 3C are views to illustrate contents of the image processing that the computing means shown in FIG. 1 carries out. A plurality of conditions of exposure time and gain are set in advance to the imaging means 5. As shown in FIG. 3A, the imaging means 5 repeats the set conditions periodically in series thereby takes images I including the core image of the other end of each of the optical fibers 81 more than once. Each taken image I is stored in the computing means 6. In the example shown in FIG. 3A, 8 conditions (condition 1 to condition 8) of the conditions of combination of exposure time and gain are set in advance, and the imaging with each condition is periodically repeated.

As shown in FIG. 3B, in the computing means 6, a area D of detection pixel to each taken image I is set by every image 81F of the other end of each optical fiber 81 in advance. In FIG. 3B, only one area D of the detection pixel is shown for convenience, however, in fact, six area Ds of detection pixel are set. The area D of detection pixel is a wider pixel area than a pixel area of the image 81F of the other end of the optical fiber 81 that can be assumed from the imaging sight of the imaging means 5. The computing means 6, for example, calculates a center of the pixel density in the area D of detection pixel, and sets the pixel located on the calculated center as a central pixel CC of the core image 81C. As shown above, by detecting the central pixel CC of the core image 81C, it is possible to inhibit influence from a mechanical position variation (variation in imaging sight) of the imaging means 5 and position variation of the core image 81C due to temperature change.

As shown in FIG. 3C, in the computing means 6, a pixel area CA for calculating average pixel density being a pixel area of neighborhood of the central pixel CC of the detected core image 81C is set in advance. For example, the pixel area CA for calculating average pixel density is a pixel area of 3×3 centering the central pixel CC. The computing means 6 calculates an average pixel density by averaging the pixel density inside the pixel area CA for calculating average pixel density. Output after A/D conversion of CCD has a random variation about 1 to 2 bits. However, by calculating the average pixel density as above, it is possible to inhibit the random variation into less than 1 bit.

Also, as shown in FIG. 3C, in the computing means 6, a pixel area BA for calculating background density, being a pixel area other than the pixel area of the image 81F of the other end of the optical fiber 81 (pixel area located a position having a predetermined distance from the central pixel CC of the detected core image 81C) is set in advance. The computing means 6 averages the pixel density inside the pixel area BA for calculating background density thereby calculates the background density. The computing means 6 subtracts the background density from the average pixel density of each core image 81C. As shown above, by subtracting the background density form the average pixel density of each core image 81C, the pixel density of each core image 81C after the subtraction in which influence of stray light, noise and the like is reduced becomes a pixel density corresponding only to a light amount of the thermal radiation light transmitted at the core, therefore it can be expected that the surface temperature of the cast slab S can be calculated with a good accuracy. The computing means 6 judges if the pixel density of each core image 81C after subtraction is in a predetermined range (for example, in a case where the imaging means 5 of 8 bits is employed, a pixel density of 50 to 200) or not. As a result of this, the core image 81C whose pixel density after subtraction is outside of the range set in advance is removed from the object of arithmetic processing mentioned below. As described above, the pixel density of each core image 81C of each taken image I (density in which the background density is subtracted from the average pixel density of each core image 81C) is calculated.

In the computing means 6, a calibration curve (corresponding relationship between the pixel density of the core image 81C and temperature) made in advance is stored. This calibration curve is made by every condition of combination of exposure time and gain. In this embodiment, since eight conditions of combination of exposure time and gain are set, eight calibration curves respectively made by the eight conditions in advance, and each calibration carve is stored in the computing means 6 associated with each condition. Also, in the computing means 6, when each taken image I is stored, a condition of each taken image I (one of conditions 1 to 8) is stored together. The computing means 6 calculates the surface temperature of the cast slab S corresponding to each core image 81C of each taken image I, by means of the pixel density of each core image 81C of each taken image I and the calibration curve associated with the condition of each taken image I. Then, the computing means 6 obtains largest value or an average value of the surface temperature corresponding to each core image 81C of the plurality of the taken images I obtained in a predetermined time period set in advance (for instance, 1 minute) by every core image 81C, and outputs the largest value or the average value as a result of surface temperature measurement of a area of the cast slab S corresponding to each core image 81C. At this time, the computing means 6 removes the core image 81C whose pixel density after subtraction is outside of the range set in advance as described above from the object to obtain the largest value or the average value. It should be noted that, in order to inhibit influence of dropping water from the support rolls R, it is preferable that the largest value of the surface temperature obtained in the predetermined time period is output as a result of surface temperature measurement.

The calibration curve described above can be made by means of a blackbody furnace and a reference radiation thermometer, changing temperature of the blackbody furnace by each 10° C. to several dozens of degrees C., obtaining a corresponding relationship between output of the reference radiation thermometer and the pixel density of the core image 81C. The calibration curve described above can be made by every optical fiber 3 (81). In this case, each calibration curve corresponding to each condition by every optical fiber 3 (81) (that is, in this embodiment, the numbers of the optical fibers 3 48×8 conditions=384 of calibration curves) are stored in the computing means 6. Also, since the variation of the sensitivity of CCD is relatively small, it can be considered that only one calibration curve for one of the optical fibers 3 (81) is made to divert for other optical fibers 3 (81). Further, in a case where transmitting efficiency of the thermal radiation light has a variety, such as a case where the light fibers 3 (81) have different lengths, it is also possible, by making one optical fiber 3 (81) as a representative channel to make an accurate calibration curve setting a lot of temperatures to a blackbody furnace, and for other optical fibers 3 (81), by carrying out temperature measurement with a few set temperatures of the blackbody furnace, thereby obtaining a corresponding relationship to the calibration of the representative channel, and using the corresponding relationship and the calibration curve of the representative channel, to presume calibration curves of the other optical fibers 3 (81).

As described above, the temperature measurement of the surface temperature of the cast slab S by the surface temperature measuring apparatus 100 is carried out.

Figure 4:
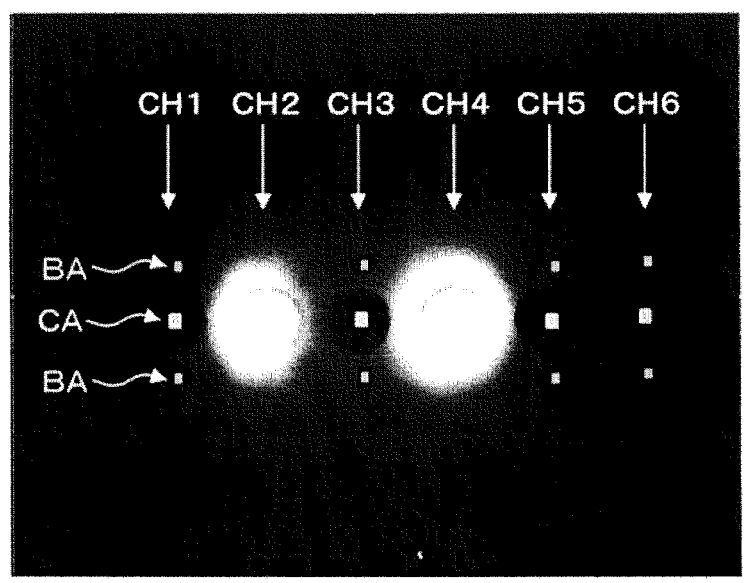
FIG. 4 is a view showing one example of images taken by an imaging means shown in FIG. 1A.

FIG. 4 is a view showing one example of the taken image I by means of the imaging means 5. In the example shown in FIG. 4, the other ends of six optical fibers 81 (CH1 to CH6) are arranged on a substantially straight line. CH2 and CH4 shown in FIG. 4 detect a thermal radiation light from a blackbody furnace having a temperature of 1400° C., and CH1, CH3, CH5 and CH6 detect a thermal radiation light from the blackbody furnace having a room temperature. As described above, in order to carry out a temperature measurement with a good accuracy, the surface temperature needs to be calculated not based on the entire image of the other end of the optical fiber 81, but based on the pixel density of the core image in which the thermal radiation light is stably transmitted. However, in a case where brightness of the thermal radiation light detected by each optical fiber 3 is greatly different from each other, output light at the other end of the optical fiber 3 in which a thermal radiation light from hot object is transmitted reflects at a fixation member of the other end of the bundle fiber 8, surface of the lens of the imaging means 5 and the like to be a stray light. In order to inhibit this stray light, as described above, other than the processing of subtracting the background density calculated at the pixel area BA for calculating background density from the average pixel density of the core image calculated at the pixel area CA for calculating average pixel density, as shown in FIG. 3B, arranging the other ends of the optical fibers 81 in a zigzag manner, to thereby make a distance as wide as possible between each of the optical fibers 81 can be considered. It is also effective to apply a non-reflecting coating to an end face of the optical fiber 3, 81.

Further, nowadays, since a two-dimensional CCD camera or the like is relatively inexpensive, it is more desirable to form an image by arranging only the optical fibers 3 (81) that transmit thermal radiation light of adjacent measuring points (when the measuring points are close to each other, difference in temperature is relatively small) by means of one imaging means 5, than to form an image of the other ends of the optical fibers 3 (81) that transmit thermal radiation lights of different measuring points by means of one imaging means 5. For example, it is found out that by using different imaging means 5 to each cross section of A to D shown in FIG. 2A on both faces (8 imaging means 5 in total), influence from the stray light can be inhibited.

The surface temperature measuring apparatus 100 according to this embodiment also needs to have a testing work regularly in order to confirm accuracy in temperature measurement and the like. Ina general test by using a radiation thermometer, there is a need to change temperatures of the blackbody furnace little by little by every radiation thermometer. However, the accuracy in temperature measurement of the surface temperature measuring apparatus 100 according to this embodiment can be considered by dividing the variety in the value of temperature measurement by one representative channel and deviation and variety in deviation of the value of temperature measurement between channels, therefore it is possible to simplify the testing work. That is, with regard to the representative channel, a normal test is carried out, on the other hand, with regard to the other channels, it is enough to confirm the deviation or the variety in deviation to the value of temperature measurement by the representative channel using 1 to several points of temperatures of the blackbody furnace, therefore the testing work can be simplified.

Figure 5:
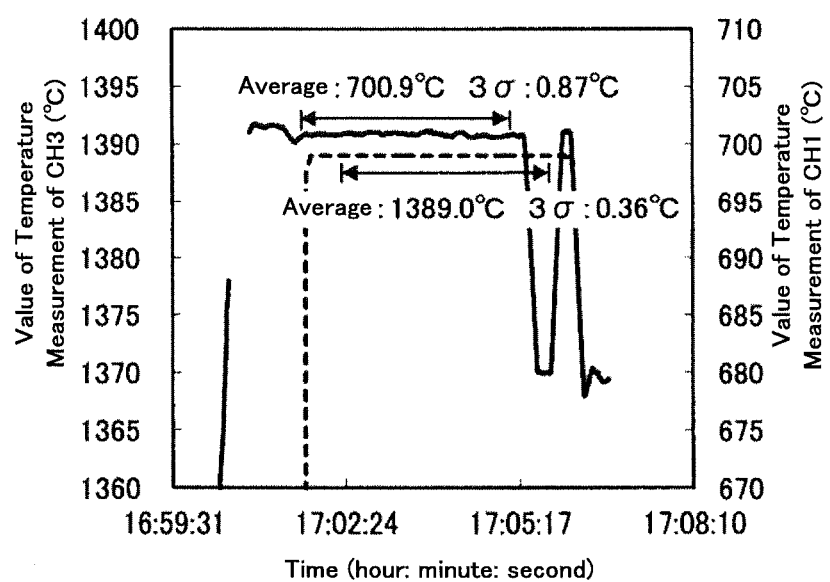
FIG. 5 is a view showing one example of results of temperature measurement in a case where thermal radiation lights from a blackbody furnace having temperatures of 1400° C. and 700° C. are received at the same time by the surface temperature measuring apparatus shown in FIG. 1A.

FIG. 5 is a graph showing one example of results of temperature measurement in a case where the other ends of six optical fibers 81 (CH1~CH6) is arranged on a substantially straight line to form an image by using the imaging means 5, wherein thermal radiation lights from a blackbody furnace having temperatures of 1400° C. and 700° C. are received at the same time, which is same in the case shown in FIG. 4. CH1 receives the thermal radiation light of 700° C., and CH3 receives the thermal radiation light of 1400° C. As described above, t was confirmed that by carrying out the processing of subtracting the background density from the average pixel density of the core image, influence from the stray light was inhibited, and both of the thermal radiation lights were able to be measured with a sufficient accuracy.

Figure 6A:
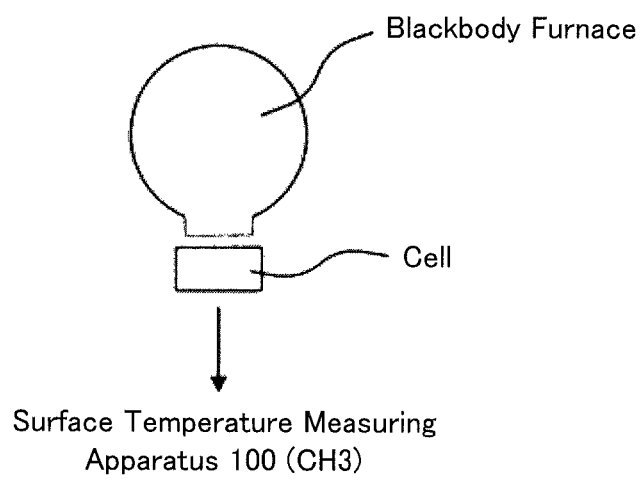
FIG. 6A is a view illustrating a general description of an experiment to confirm en effect of an optical filter that transmits only light having shorter wavelength than 0.9 μm disposed between a lens and an imaging device of the imaging means shown in FIG. 1A.
Figure 6B:
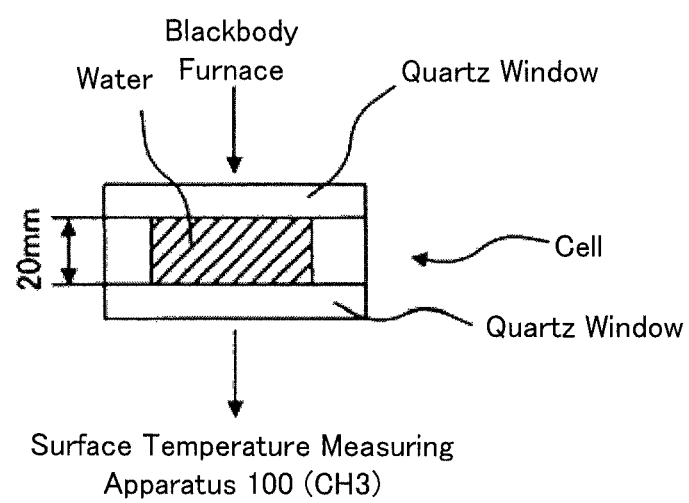
FIG. 6B is a view illustrating a structure of a cell used in the experiment to confirm an effect of the optical filter that transmits only light having shorter wavelength than 0.9 μm disposed between the lens and the imaging device of the imaging means shown in FIG. 1A.
Figure 6C:
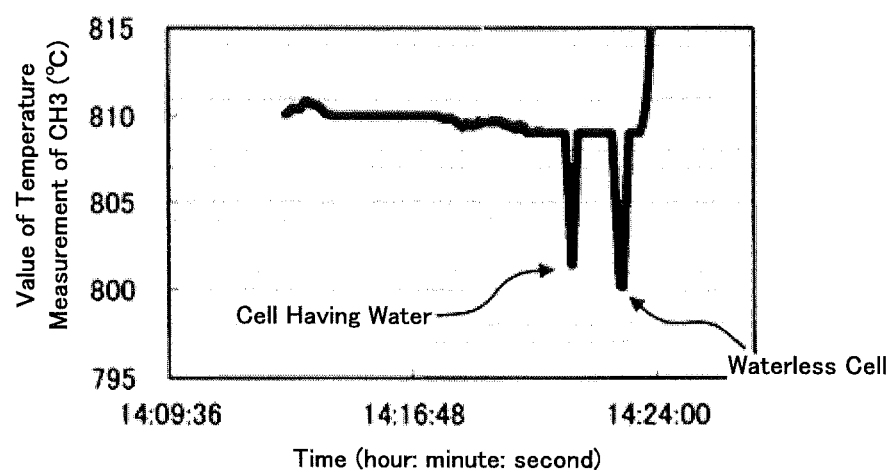
FIG. 6C is a view showing a result of the experiment to confirm the effect of the optical filter that transmits only light having shorter wavelength than 0.9 μm disposed between the lens and the imaging device of the imaging means shown in FIG. 1A.

FIG. 6A is a view illustrating summary of an experiment confirming the effect of the optical filter that transmits only light having wavelength shorter than 0.9 μm disposed between the lens and the imaging device of the imaging means 5. FIG. 6B is a view illustrating the structure of the cell used in the experiment whose summary is shown in FIG. 6A. FIG. 6C is a view illustrating result of the experiment whose summary is shown in FIG. 6A. In this experiment, as shown in FIG. 6A, a cell was inserted in between the surface temperature measuring apparatus 100 according to the present invention and a blackbody furnace having a preset temperature of 810° C., and change in value of the temperature measurement when the cell was inserted was confirmed. As shown in FIG. 6C, there is only 1° C. difference in value of the temperature measurement after the insertion between in a case where a 20 mm thickness of water is in the cell and in a case where water is not in the cell. The waterless cell configured in the same manner as in the cell shown in FIG. 6B except that the cell does not have water has an error in temperature measurement due to reflecting light because the waterless cell has 4 interfaces of the quarts window. Considering this, the error in temperature measurement due to absorption by water having a thickness of 20 mm can be estimated at around 4.5° C. From this, it can be said that the error in temperature measurement can be inhibited within around 5° C. if the thickness of water is less than 20 mm.

Figure 7A:
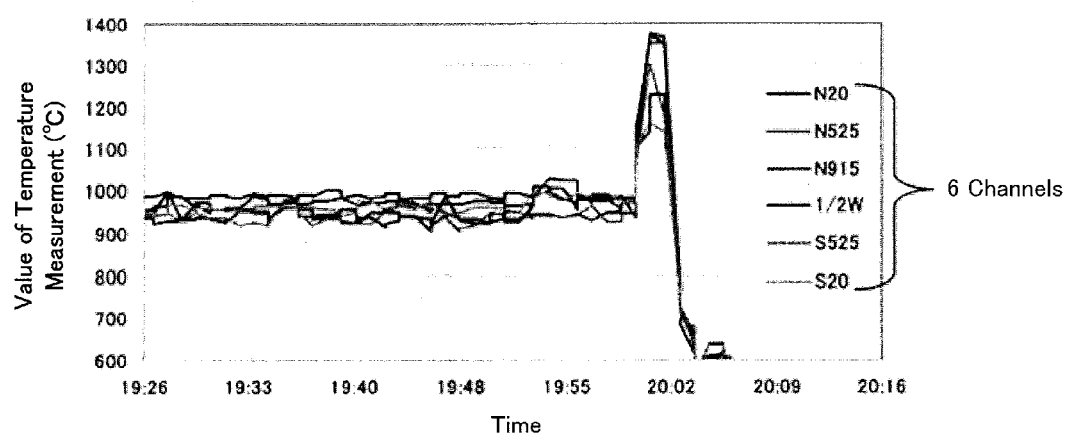
FIG. 7A is a view showing one example of measurement results of the surface temperature of the cast slab measured by the surface temperature measuring apparatus shown in FIG. 1A.
Figure 7B:
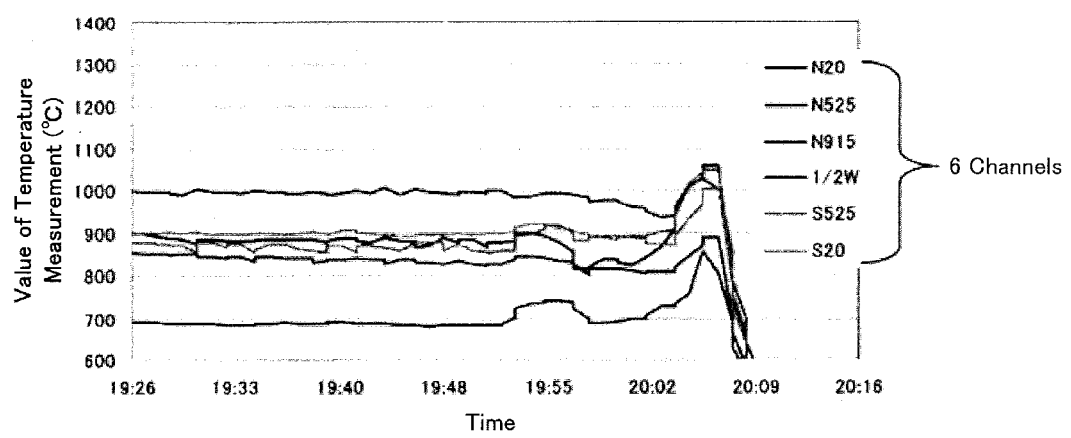
FIG. 7B is a view showing another example of measurement results of the surface temperature of the cast slab measured by the surface temperature measuring apparatus shown in FIG. 1A.

FIG. 7A is a view showing an example of results of measurement of the surface temperature of the cast slab S measured by the surface temperature measuring apparatus 100 according to the present invention, and showing results of temperature measurement of 6 channels on the back side of the cross section A shown in FIG. 2A. FIG. 7B is a view showing another example of results of measurement of the surface temperature of the cast slab S measured by the surface temperature measuring apparatus 100 according to the present invention, and showing results of temperature measurement of 6 channels on the back side of the cross section B shown in FIG. 2A. As shown in FIGS. 7A and 7B, according to the surface temperature measuring apparatus 100 of the present invention, it was possible to stably measure the temperatures of many points of the cast slab S being casted by a continuous caster. As a result of this, it became possible to inhibit generation of surface cracking. It became also possible to inhibit improper decrease in productivity (decrease of casting speed) because of fear to generation of surface cracking.

Description of the Reference Numerals
AIR air column
r1 inner diameter of nozzle
R support roll
RC central axis of support roll
S cast slab
X chamber
1 nozzle
2 flexible tube (tube)
3,81 optical fiber
4 housing
5 imaging means
6 computing means
7 FC connector
8 bundle fiber
51 optical filter
100 Surface temperature measuring apparatus

The invention claimed is:

1. A method for measuring a surface temperature of a cast slab at a secondary cooling zone of a continuous caster, the method comprising the steps of:
providing a plurality of nozzles, each nozzle having an inner cross section substantially circular in shape and an inner diameter of 5 mm to 30 mm;
providing a plurality of optical fibers, each of the optical fibers having one end and another end;
inserting the one end of each of the plurality of optical fibers into each of the plurality of nozzles;
providing a plurality of tubes made of stainless steel, each tube connected to each of the nozzles such that a light axis of each of the optical fibers each substantially coincides with a central axis of each of the nozzles;
positioning the plurality of the nozzles such that each of the nozzles is located between support rolls of the continuous caster that support the cast slab;
spraying purge air from each of the nozzles toward a surface of the cast slab to form an air column and receiving a thermal radiation light from the cast slab at the one end of each of the optical fibers, the thermal radiation light passing through the air column formed by the purge air;
gathering the other ends of the optical fibers in a bundle inside a housing in communication with each of the tubes to take images including core images of the other ends of the optical fibers gathered in the bundle, by using a two-dimensional or one-dimensional imaging means disposed inside the housing; and
calculating the surface temperature of an area of the cast slab corresponding to each of the core images based on a pixel density of each of the core images in the taken images.

2. The method for measuring a surface temperature of a cast slab according to claim 1, wherein each of the nozzles are positioned such that a top end of each nozzle is located on a side farther from the surface of the cast slab than a central axis of each of the support rolls.

3. The method for measuring a surface temperature of a cast slab according to claim 1, the method comprising adjusting a flow amount of the purge air such that a diameter of the air column at a portion having contact with the surface of the cast slab is 30 mm to 40 mm.

4. The method for measuring a surface temperature of a cast slab according to claim 1, the method comprising installing the housing outside a chamber in which the support rolls are arranged, and making an inside of the nozzles, the tubes, and the housing in a state of positive pressure.

5. The method for measuring a surface temperature of a cast slab according to claim 1, the method comprising detecting a center pixel of each of the core images in the images taken by the imaging means and calculating the surface temperature of the area of the cast slab corresponding to each of the core images based on an average pixel density of neighborhood of the center pixel in each of the core images, the neighborhood being a pixel area of 3×3 centering the central pixel.

6. The method for measuring a surface temperature of a cast slab according to claim 1, the method comprising calculating a background density based on the pixel density of pixel area other than the pixel area of the image of the other end of each of the optical fibers in the image taken by the imaging means, subtracting the calculated background density from the pixel density of each of the core images, and calculating the surface temperature of the area of the cast slab corresponding to each of the core images based on the pixel density of each of the core images after the subtracting step.

7. The method for measuring a surface temperature of a cast slab according to claim 1, the method comprising: setting a plurality of conditions of combination of exposure time and gain of the imaging means in advance; taking images including the core images of the other ends of the optical fibers gathered in a bundle more than once by repeating the set conditions periodically in series; selecting an image of each of the core images whose pixel density is in a predetermined range, by each of the core images, from the plurality of taken images; and calculating the surface temperature of the area of the cast slab corresponding to each of the core images based on the pixel density of each of the core images in the selected image.

8. The method for measuring a surface temperature of a cast slab according to claim 1, the method comprising disposing an optical filter that transmits only light having shorter wavelength than 0.9 pm between a lens and an imaging device of the imaging means, and taking images of the light transmitted the optical filter by the imaging means.

9. The method for measuring a surface temperature of a cast slab according to claim 1, providing a flow control valve and a flow monitor for each nozzle, the flow control valve and the flow monitor attached to a pipe supplying compressed air for spraying of the purge air so that a flow amount of compressed air introduced to each nozzle can be separately adjusted.

10. An apparatus for measuring a surface temperature of a cast slab at a secondary cooling zone of a continuous caster, the apparatus comprising:
  a plurality of nozzles, each of the plurality of nozzles located between support rolls of the continuous caster that support the cast slab, each of the plurality of nozzles having an inner cross section of substantially circular in shape, an inner diameter of between 5 mm and 30 mm, and adapted for spraying purge air toward the surface of the cast slab;
  a plurality of tubes made of stainless steel, each tube connected to each of the plurality of nozzles;
  a plurality of optical fibers having one end and another end, each one end inserted in each of the nozzles and each of the tubes such that a light axis of each of the optical fibers substantially coincides with a central axis of each of the nozzles, the optical fibers each receiving a thermal radiation light from the cast slab at each one end thereof, the thermal radiation light passing through the air column formed by the purge air;
  a housing in communication with each of the tubes, the other ends of the optical fibers gathered in a bundle disposed in the housing;
  an imaging means disposed in the housing, the imaging means taking two-dimensional or one-dimensional images including core images of the other ends of the optical fibers gathered in a bundle; and
  a computing means to calculate a surface temperature of an area of the cast slab corresponding to each of the core images based on a pixel density of each of the core images in the taken images.

11. The surface temperature measuring apparatus of cast slab according to claim 10, wherein a top end of each of the plurality of nozzles is located on a side farther from the surface of the cast slab than a central axis of each of the support rolls.

12. The surface temperature measuring apparatus of cast slab according to claim 10, wherein a diameter of the air column at a portion having contact with the surface of the cast slab is 30 mm to 40 mm.

13. The surface temperature measuring apparatus of cast slab according to claim 10, wherein the housing is installed outside a chamber in which the support rolls are arranged, and an inside of each of the nozzles, each of the tubes, and the housing are in a state of positive pressure.

14. The surface temperature measuring apparatus of cast slab according to claim 10, wherein an optical filter that transmits only light having shorter wavelength than 0.9 μm is disposed between a lens and an imaging device of the imaging means.

15. The surface temperature measuring apparatus of cast slab according to claim 10, further comprising a flow control valve and a flow monitor for each nozzle, the flow control valve and the flow monitor attached to a pipe supplying compressed air for spraying of the purge air so that a flow amount of compressed air introduced to each nozzle can be separately adjusted.

* * * * *

UNITED STATES PATENT AND TRADEMARK OFFICE
CERTIFICATE OF CORRECTION

| | |
|---|---|
| PATENT NO. | : 9,188,493 B2 |
| APPLICATION NO. | : 14/351691 |
| DATED | : November 17, 2015 |
| INVENTOR(S) | : Honda et al. |

It is certified that error appears in the above-identified patent and that said Letters Patent is hereby corrected as shown below:

Claims

Column 21, Line 27, Claim 8:

wavelength than 0.9 pm between a lens and an imaging device
should read:
wavelength than 0.9 µm between a lens and an imaging device Signed and Sealed this
Tenth Day of May, 2016

Michelle K. Lee
*Director of the United States Patent and Trademark Office*